United States Patent Office 3,492,225
Patented Jan. 27, 1970

3,492,225
COAGULATION AND SETTLING OF FINELY DIVIDED SOLIDS FROM AQUEOUS SUSPENSIONS THEREOF
John W. Ryznar, Burlington, Ontario, Canada, assignor to Nalco Chemical Company, Chicago, Ill., a corporation of Delaware
No Drawing. Application June 19, 1961, Ser. No. 117,843, which is a division of application Ser. No. 341,367, Mar. 9, 1953. Divided and this application Nov. 2, 1966, Ser. No. 591,426
Int. Cl. B01d 21/01
U.S. Cl. 210—54         6 Claims This application is a division of my copending application, Ser. No. 117,843, filed June 19, 1961, which is a division of Ser. No. 341,367, filed Mar. 9, 1953, now abandoned.

This invention relates to a method of coagulating and producing settling of finely divided solids which are predominantly inorganic and normally remain suspended in water, more particularly dilute suspensions in water containing concentrations within the range of about .003% to about 3% by weight of said solids.

One of the most difficult industrial problems is to clarify industrial waste which would otherwise create a nuisance and cause pollution in lands and streams. Examples of such wastes are phosphate mine waters, coal washing waters, clay suspensions, calcium carbonate suspensions, and other suspensions of finely divided solids in water which result from industrial processes such as mining, washing, purification, and the like. These suspensions normally contain the solid materials in very finely divided form in concentrations within the range of about .003% to about 3% by weight of the suspension. Such suspensions will remain stable for days and many of them are not affected by the addition or ordinary coagulants such as alum. If the solids are allowed to remain in suspension the resultant suspension cannot be utilized for industrial processes and also presents a disposal problem.

One of the objects of the present invention is to provide a new and improved method for coagulating and producing settling of finely divided solids which are predominantly inorganic and normally remain suspended in water in concentrations of .003% to 3% by weight of the suspension.

Another object of the invention is to provide a method of treating suspensions of the type described with relatively small amounts of materials which will produce settling of the finely divided solids without any other harmful result. Other objects will appear hereinafter.

In accordance with the invention it has been found that it is possible to produce coagulation and settling of finely divided solids which are predominantly inorganic and normally remain suspended in water in concentrations of .003% to 3% by weight of the suspension by treating said suspensions with about 1 to 15 parts per million based on the weight of the total suspension of a synthetic water dispersible polymer having a weight average molecular weight of at least 10,000 and having a structure derived by the polymerization of at least one monoolefinic compound through the aliphatic unsaturated group, said structure being substantially free of crosslinking. The treating agents which have been found to be especially effective for the purpose of the invention are water dispersible synthetic polymers having a linear hydrocarbon structure and containing in a side chain a hydrophilic group from the class consisting of carboxylic acid, carboxylic acid anhydride, carboxylic acid amide, hydroxy, pyridine, pyrrolidone, hydroxy alkyl ether, alkoxy, and carboxylic acid salt groups.

The treating agents which are effective for the purpose of the invention fall in three classes, namely (1) those consisting of polymeric organic substances which in an aqueous medium will form organic anions having a substantial number of negative electrical charges distributed at a plurality of positions on the polymer; (2) those consisting of polymeric organic substances which in an aqueous medium will form organic cations having a substantial number of positive charges distributed at a plurality of positions on the polymer; and (3) those consisting of polymeric organic substances which in an aqueous medium will not form ions but nevertheless contain a sufficient number of hydrophilic groups to be water dispersible. The first class of materials is referred to herein as anionic organic polymers, the second class is referred to herein as cationic organic polymers, and the third class is referred to herein as non-ionic organic polymers. The first two classes can also be referred to as polyeletrolytes.

The term "polyelectrolyte" is intended to cover synthetic organic polymers which in an aqueous medium will form organic ions having a substantial number of electrical charges distributed at a plurality of positions.

The synthetic organic polymers containing only carboxylic acid, carboxylic acid anhydride, and carboxylic acid salt groups in a side chain are anionic. The synthetic organic polymers containing only pyridine or other similar nitrogen containing nucleus are cationic. The synthetic organic polymers containing only a carboxylic acid amide, pyrrolidone, a hydroxy, a hydroxy alkyl ether and/or an alkoxy group in a side chain are non-ionic. The invention contemplates the employment of polymers which contain anionic, cationic and/or non-ionic groups. It also contemplates the employment of mixtures of anionic, cationic and/or non-ionic water dispersible synthetic organic polymers.

An important class of treating agents employed for the purpose of the invention consists of the synthetic polymeric water soluble polyelectrolytes having an average molecular weight greater than 10,000 which are copolymers of compounds containing the group

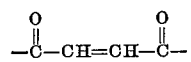

and at least one other monoolefinic monomer.

Another important class of treating agents employed for the purpose of the invention consists of synthetic water soluble polyelectrolytes having a weight average molecular weight of at least 10,000 which are polymers of a compound containing the molecular group

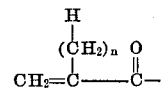

wherein $n$ is an integer from zero (0) to one (1) inclusive.

The following water dispersible synthetic organic polymers and their characteristic grouping illustrate the types of polymers which have been found to be effective for the practice of the invention:

| No. | Name | Characteristic Grouping |
|---|---|---|
| 1 | Polyacrylate sodium salt. | —CH$_2$—CH—<br>　　　　 \|<br>　　　　COO(−)<br>　　　　Na(+) |
| 2 | Polymethacrylic acid copolymer sodium salt. | 　　CH$_3$<br>　　　\|<br>—CH$_2$—C—<br>　　　\|<br>　　COO(−)<br>　　　Na(+) |
| 3 | Maleic anhydride-vinyl acetate. | —CH—CH$_2$—CH—CH—<br>　\|　　　　　 \|　　\|<br>　O　　　　　C　　C=O<br>　\|　　　　　 ∥　 /<br>CH$_3$C=O　　O　O |

| No. | Name | Characteristic Grouping |
|---|---|---|
| 4 | Polyvinyl methyl ether-maleic anhydride. | —CH—CH₂CH——CH—<br>  \|           \|       \|<br>  OCH₃    C      C=O<br>              \\  /<br>              O |
| 5 | Methacrylic acid-methacrylamide. | CH₃         CH₃<br>  \|             \|<br>—CH₂C—CH₂——C—<br>  \|             \|<br>  COO(−)    CONH₂<br>  H(+) |
| 6 | Polyacrylic acid. | —CH₂—CH—<br>         \|<br>         COO(−)<br>         H(+) |
| 7 | Isopropenyl acetate-maleic anhydride sodium salt. | CH₃<br>  \|<br>—CH₂—C———CH—CH—<br>         \|         \|      \|<br>         O      C=O C=O<br>         \|         \|      \|<br>   CH₃C=O  O(−) O(−)<br>                 Na(+) Na(+) |
| 8 | Itaconic acid vinyl acetate. | COO(−)<br>  \|<br>—C—CH₂———CH₂·CH—<br>  \|                            \|<br>  CH₂COO(−)           O<br>       H(+)       CH₃C=O |
| 9 | Polyvinyl pyridine-hydrochloride. | CH₂—CH—<br>            \|<br>           (pyridinium ring)<br>            NH(+) Cl(−) |
| 10 | 2-methyl styrene maleic anhydride sodium salt. | CH₃<br>  \|<br>  C——CH₂—CH———CH—<br>  \|                \|            \|<br> (phenyl)     COO(−)   COO(−)<br>                   Na(+)     Na(+) |
| 11 | Polyvinyl pyrrolidone. | H<br>—C—CH₂—<br>  \|<br>  N<br>  / \<br>H₂C   C=O<br>  \|     \|<br>H₂C——CH₂ |
| 12 | Styrene-maleic. | —CH—CH₂—CH———CH—<br>   \|              \|            \|<br>(phenyl)  COO(−)  COO(−)<br>               Na(+)    Na(+) |
| 13 | Polyvinyl alcohol. | —CH—CH₂<br>   \|<br>   OH |
| 14 | Polyvinyl methyl ether. | —CH—CH₂—<br>   \|<br>   OCH₃ |
| 15 | Methylmethacrylate-maleic anhydride sodium salt. | CH₃<br>  \|<br>—C—CH₂—CH———CH—<br>  \|             \|             \|<br>  COOCH₃ COO(−) COO(−)<br>                Na(+)     Na(+) |
| 16 | Polyvinyl acetate emulsion. | —CH—CH₂—<br>   \|<br>   O<br>   \|<br>   CH₃C=O |
| 17 | Acrylic acid styrene copolymer. | —CH—CH₂—CH—CH—<br>   \|               \|<br>(phenyl)      COO(−)<br>                   H(+) |

Any of the polyelectrolytes disclosed in United States Patent No. 2,625,529 can be employed for the purpose of the invention. Where the copolymer is derived from a polycarboxylic acid derivative and at least one other monomer copolymerizable therewith the polycarboxylic acid derivative may be maleic anhydride, maleic acid, fumaric acid, itaconic acid, aconitic acid, citraconic acid, the amides of these acids, the alkali metal (e.g. sodium, potassium and lithium), the alkaline earth metal (e.g. magnesium, calcium, barium and strontium), and ammonium salts of these acids, the partial alkyl esters (e.g. methyl, ethyl, propyl, butyl mono esters), the salts of said partial alkyl esters, and the substituted amides of these polycarboxylic acids. Where the hydrophilic maleic acid derivatives are used as one of the starting components to form the copolymer the hydrophobic comonomers may be, for example, styrene, alphamethylstyrene, vinyl toluene, chlorostyrenes, vinyl acetate, vinyl chloride, vinyl formate, vinyl alkyl ethers, alkyl arcrylates, alkyl methacrylates, ethylene, propylene, and/or isobutylene.

The foregoing synthetic copolymers are preferably obtained by reacting equimolar proportions of a polycarboxylic acid derivative and at least one other monomer but certain of the hydrophilic derivatives of unsaturated polycarboxylic acids can be polymerized in less than equimolar proportions with some of the less hydrophobic comonomers, for example, vinyl formate and vinyl acetate.

Some of the synthetic organic polymers and copolymers are more effective than others, the effectiveness being dependent in part upon the kind and number of said chain groupings in the particular polymer, the molecular weight thereof, and the type of suspension being treated. In general, for effective results the polymer should have a relatively high molecular weight in excess of 10,000 and ordinarily within the range of 15,000 to 100,000.

The invention will be illustrated but is not limited by the following examples, in which the quantities are stated in parts by weight unless otherwise indicated.

EXAMPLE I

The invention was evaluated on a phosphate mine water known as Bonny Lake hydroseparator overflow water containing 21,000 parts per million of suspended solids. Various types of polymers were added in varying proportions. A polymer corresponding to Formula No. 1 (Acrysol GS) was added at the rate of 0.5 part per million, 1.0 part per million and 2.0 parts per million. Various dilutions of the Bonny Lake water with water were made and the following results were noted:

| Suspended Solids, p.p.m. | 0.5 p.p.m. Acrysol GS | 1.0 p.p.m. Acrysol GS | 2.0 p.p.m. Acrysol GS |
|---|---|---|---|
| 21,000 | Little or no coagulation. | Beginning coagulation. | Fair coagulation. |
| 5,200 | Fair coagulation | Good coagulation | Good coagulation. |
| 1,300 | Good coagulation | Very good coagulation. | Very good coagulation. |
| 300 | do | do | Do. |
| 80 | do | do | Do. |
| 65 | do | Good coagulation | Good coagulation. |
| 50 | Fair coagulation | Fair coagulation | Fair coagulation. |
| 40 | Poor coagulation | Poor coagulation | Do. |
| 30 | No coagulation | No coagulation | No coagulation. |
| 20 | do | do | Do. |

In a similar manner additional quantities of sodium polyacrylate were added to this water. The size of the floc of the particles increased as more sodium polyacrylate was added and no adverse effect on coagulation was noted at dosages as high as 50 parts per million. Very good cogulation was obtained at a dosage of about 4 parts per million in the Bonny Lake hydroseparator overflow water containing 21,000 parts per million of suspended solids.

EXAMPLE II

Bonny Lake water containing 21,000 parts per million of suspended solids was treated with a compound corresponding to Formula No. 6 (Acrysol A–1) and very good coagulation was obtained at a dosage of 4 parts per million. A related compound (Orthocryl C) gave good coagulation at a dosage of 1 part per million.

EXAMPLE III

A phosphate mine water known as Pauway No. 4 hydroseparator overflow containing 7400 parts per million of suspended solids was treated wtih sodium polyacrylate (Acrysol GS) in one case and polyacrylic acid (Acrysol A-1) in another which were added in increments to samples of this water. The coagulation of Pauway No. 4 water occurred at dosages as low as 0.05 part per million of either coagulant. It was noted that the floc size in the water treated with the polyacrylic acid did not appreciably increase over the initial size regardless of the amount of coagulant added.

EXAMPLE IV

The Pauway No. 4 water was diluted and various amounts of sodium polyacrylate added with the following results:

| Suspended Solids, p.p.m. | 0.4 p.p.m. Acrysol GS | 1.0 p.p.m. Acrysol GS | 2.0 p.p.m. Acrysol GS |
|---|---|---|---|
| 74 | Good coagulation | Very good coagulation. | Very good coagulation. |
| 50 | Fair coagulation | Good coagulation | Good coagulation. |
| 40 | Poor to fair coagulation. | ___do___ | Do. |
| 30 | Poor coagulation | Fair coagulation | Do. |
| 20 | Little or no coagulation | Poor coagulation | Fair coagulation. |

From these results it is noted that with this particular water in the concentrations of polymer employed the suspended solids in the water should be at least 20 parts per million before the treatment is effective.

EXAMPLE V

The Bonny Lake hydroseparator overflow water containing 20,000 parts per million of suspended solids was adjusted to various pH values by adding small quantities of 1.0 normal hydrochloric acid solution or 1.0 normal sodium hydroxide solution. Sodium polyacrylate (Acrysol GS) was added in small increments with a period of stirring with each adjustment and the coagulation effect on each test sample was observed. The results are summarized in the following table:

| pH | Acrysol GS | Acrysol GS | Acrysol GS |
|---|---|---|---|
| 3.0 | Fair coagulation due to acid. | Fair coagulation | Fair coagulation. |
| 4.1 | Slight coagulation due to acid. | Poor coagulation | Do. |
| 5.1 | ___do___ | ___do___ | Fair to good coagulation. |
| 6.0 | No coagulation | Fair coagulation | Good coagulation. |
| 6.7 | Coagulation beginning. | Good coagulation | Very good coagulation. |
| 7.2 | ___do___ | ___do___ | Do. |
| 7.9 | ___do___ | ___do___ | Do. |
| 8.5 | No coagulation | No coagulation | Coagulation beginning. |
| 9.0 | ___do___ | ___do___ | No coagulation. |
| 10.0 | ___do___ | ___do___ | Do. |
| 11.0 | ___do___ | ___do___ | Do. |

At pH values of 5.1 and below, a certain amount of coagulation was apparent before any sodium polyacrylate had been added. This coagulation due to acid was not very effective and the size of the floc was very small. However, the acid coagulation resulted in a clearer water after the floc had settled than the water obtainable using sodium polyacrylate alone at a higher pH.

In a similar manner the Pauway No. 4 phosphate mine water was tested and excellent coagulation with sodium polyacrylate (Acrysol GS) in the pH range of 4.5 to 9.4 was obtained.

EXAMPLE VI

Coagulation tests were made on water from the circulating system of the Franklin Coal Washer Plant, Bethlehem Steel Company, containing 18,800 parts per million of suspended solids which appeared to consist almost entirely of finely divided coal particles. The pH of this water was about 7.8. In the results given in the following table the settling times are given in terms of the minutes required for approximately 99% of the solids to precipitate after stirring was discontinued.

| Test | Treatment | Coagulation | Settling Time, Minutes |
|---|---|---|---|
| 1 | None | Poor | 15 |
| 2 | Sodium Polyacrylate (Acrysol GS) 2 p.p.m. | Very good | 1 |

EXAMPLE VII

A sodium polymethacrylate polymer was tested and found to be a good coagulant for the Bonny Lake phosphate water at a dosage of 8 parts per million and for Pauway No. 4 water at a dosage of 1 part per million.

EXAMPLE VIII

A maleic anhydride vinyl acetate polymer (Formula No. 3) was tested and found to be a good coagulant for the Pauway No. 4 phosphate mine water at a dosage of 1 part per million.

EXAMPLE IX

Pauway No. 4 mine water was treated with a compound corresponding to Formula No. 5 and very good coagulation was obtained at a dosage of 1 part per million.

EXAMPLE X

Pauway No. 4 phosphate mine water was treated with a compound corresponding to Formula No. 10 and coagulation was obtained at a dosage of 4 parts per million.

EXAMPLE XI

Pauway No. 4 phosphate mine water was treated with a compound corresponding to Formula No. 11 and good coagulation was obtained at a dosage of 4 parts per million.

EXAMPLE XII

Pauway No. 4 phosphate mine water was treated with a compound corresponding to Formula No. 12 and good coagulation was obtained at a dosage of 1 part per million.

EXAMPLE XIII

Pauway No. 4 phosphate mine water was treated with a compound corresponding to Formula No. 13 (high viscosity type A polyvinyl alcohol) and good coagulation was obtained at a dosage of 5 parts per million.

EXAMPLE XIV

A coal suspension containing 2000 parts per million of suspended solids was treated with a compound corresponding to Formula No. 3 and coagulation was obtained at a dosage of 1 part per million.

EXAMPLE XV

A coal suspension containing 2000 parts per million of solids was treated with a compound corresponding to Formula No. 4 and coagulation was obtained at a dosage of 5 parts per million.

EXAMPLE XVI

A coal suspension containing 2000 parts per million of suspended solids was treated with a compound corresponding to Formula No. 9 and good coagulation was obtained at a dosage of 1 part per million.

EXAMPLE XVII

A synthetic water was prepared by adding bentonite to Chicago water in order to produce a suspension of 2000 parts per million of suspended solids. Good to very good coagulation of this suspension was obtained at a dosage of 1 part per million with each of the compounds corresponding to Formula Nos. 1 to 8. The compound corresponding to Formula No. 9 gave very good coagulation at a dosage of 5 parts per million. The compound corresponding to Formula No. 10 gave fair coagulation at 1 part per million. The compound corresponding to Formula No. 11 gave good coagulation at 5 parts per million. The compound corresponding to Formula No. 12 gave fair coagulation at 5 parts per million. The compound corresponding to Formula No. 13 gave fair coagulation at 1 part per million. The compound corresponding to Formula No. 14 gave good coagulation at 5 parts per million. The compound corresponding to Formula No. 15 gave fair coagulation at 1 part per million. The compound corresponding to Formula No. 16 gave fair coagulation at 5 parts per million and very good coagulation at 15 parts per million. The compound corresponding to Formula No. 17 gave fair coagulation at 5 parts per million.

EXAMPLE XVIII

A synthetic water was prepared containing 2000 parts per million of calcium carbonate in suspension in Chicago tap water. Very good coagulation of this water was obtained with sodium polyacrylate at a dosage of 5 parts per million. Fair to good coagulation of this water was obtained with a compound corresponding to Formula No. 4 at a dosage of 1 part per million. Good coagulation of this suspension was obtained with compounds corresponding to Formula No. 6 at a dosage of 1 part per million. Good coagulation of this suspension was obtained with compounds corresponding to Formula No. 9 at a dosage of 5 parts per million.

In a similar manner various types of synthetic polymers were tested and found to be effective in coagulating suspensions such as iron ore suspensions and carbonation juice in beet sugar processes. Sodium polyacrylate (Formula No. 1) and polymethyl ether maleic anhydride polymers (Formula No. 4) were found to be effective in increasing the size and rate of settling of the floc of the second carbonation juice from a beet sugar manufacturing plant at concentrations of 2.5 and 5 parts per million respectively.

In general, the polymers employed in accordance with the invention appear to be particularly effective at a pH between about 4.5 and 9.5 and the optimum effectiveness in most cases is at a pH value between 6 and 8 particularly in coal washing waters and phosphate mine waters.

The invention is especially valuable in the clarification of high turbidity waters and in removing from suspension suspended solids which otherwise would be objectionable and would interfere with the disposal of various types of waste waters and wash waters from industrial processes. The use of the invention makes it possible to cause the settling of many different types of solids from suspensions thereof at a higher rate than has heretofore been possible in many instances. The invention is also applicable to coagulating and producing settling of finely divided solids, many of which could not heretofore be coagulated by ordinary methods. Furthermore, the addition agents employed in the practice of the invention are effective in extremely small quantities and do not produce harmful contaminants.

The term "synthetic organic polymer" is employed herein to cover high molecular weight compounds made by building up the same molecule of a given monomer or by copolymerizing two or more different monomers. The term "monoolefinic" means that the monomer of monomers from which the polymer is derived contain a single double bond.

The invention is hereby claimed as follows:

1. A method of coagulating and producing settling of finely divided solids which are predominantly inorganic and normally remain suspended in water in concentrations of .003% to 3% by weight of the suspension which comprises treating said suspension with about 1 to 15 parts per million based on the weight of the total suspension of a synthetic polymer in a water dispersible state having a weight average molecular weight of at least 10,000 and having a linear hydrocarbon structure containing an alkoxy group in a side chain, and separating the resultant coagulated solids from suspension in said water.

2. A process as claimed in claim 1 in which the pH is 4.5 to 9.5.

3. A process as claimed in claim 1 in which said polymer also contains a carboxy group in a side chain.

4. A process as claimed in claim 1 in which said suspension is a phosphate mine water.

5. A process as claimed in claim 1 in which said suspension is a coal wash water.

6. A process as claimed in claim 1 in which the side chains of said polymer are composed solely of alkoxy groups.

References Cited

UNITED STATES PATENTS 3,418,237    12/1968    Booth et al. ---------- 210—54

MICHAEL E. ROGERS, Primary Examiner

UNITED STATES PATENT OFFICE
CERTIFICATE OF CORRECTION

Patent No. 3,492,225                    Dated January 27, 1970

Inventor(s) John W. Ryznar

It is certified that error appears in the above-identified patent and that said Letters Patent are hereby corrected as shown below:

Column 3, in the table, entry 6, under "Characteristic Grouping", that portion of the formula reading $$\begin{matrix} \text{COO}(-) \\ | \\ -\text{C} \\ | \\ \text{CH}_2\text{COO}(-) \end{matrix}$$
" should read '''
$$\begin{matrix} \text{COO}(-) \\ \backslash \\ -\text{C} \\ / \\ \text{CH}_2\text{COO}(-) \end{matrix}$$
'''

Column 4, line 16, "arcrylates" should read --acrylates--

Signed and sealed this 30th day of June 1970.

(SEAL)
Attest:

EDWARD M. FLETCHER, JR.
Attesting Officer

WILLIAM E. SCHUYLER, JR.
Commissioner of Patents